United States Patent
Muthiah et al.

(10) Patent No.: US 12,422,910 B2
(45) Date of Patent: Sep. 23, 2025

(54) THERMAL RECOVERY IN MULTI-PROTOCOL DEVICES

(71) Applicant: SANDISK TECHNOLOGIES, INC., San Jose, CA (US)

(72) Inventors: Ramanathan Muthiah, Bangalore (IN); Vinod Sasidharan, Bangalore (IN); Vimal Jain, Bangalore (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 18/235,956

(22) Filed: Aug. 21, 2023

(65) Prior Publication Data

US 2025/0068222 A1  Feb. 27, 2025

(51) Int. Cl.
G06F 1/32 (2019.01)
G06F 1/26 (2006.01)
G06F 1/3234 (2019.01)

(52) U.S. Cl.
CPC ............ G06F 1/266 (2013.01); G06F 1/3275 (2013.01)

(58) Field of Classification Search
CPC ................................ G06F 1/266; G06F 1/3275
See application file for complete search history.

(56) References Cited

U.S. PATENT DOCUMENTS

| | | | |
|---|---|---|---|
| 5,519,886 A * | 5/1996 | Gilbert | H04B 1/036 455/117 |
| 9,760,311 B1 | 9/2017 | Amir | |
| 10,635,131 B2 | 4/2020 | Tzafrir | |
| 11,087,801 B1 | 8/2021 | Golov | |
| 11,442,665 B2 | 9/2022 | Balakrishnan | |
| 2016/0062421 A1 * | 3/2016 | Sugawara | G06F 1/3268 700/299 |
| 2017/0003889 A1 * | 1/2017 | Kim | G06F 3/0659 |
| 2018/0260152 A1 * | 9/2018 | Bar | G06F 3/0688 |
| 2019/0025784 A1 * | 1/2019 | Yum | G05B 19/042 |
| 2021/0223851 A1 * | 7/2021 | Kim | G06F 1/28 |
| 2022/0269629 A1 | 8/2022 | Pinto | |
| 2023/0236738 A1 * | 7/2023 | Huang | G06F 3/0659 711/154 |

* cited by examiner

*Primary Examiner* — Zahid Choudhury
(74) *Attorney, Agent, or Firm* — Arlene Neal; NEAL BLIBO LLC

(57) ABSTRACT

A multi-protocol storage device avoids entering a thermal shutdown mode by switching between protocols. The storage device communicates with a host in a first mode using a first protocol. The storage device receives a temperature request from the host, monitors its temperature, and transmits a response to the host when the temperature of the storage device meets a predefined temperature that is below a thermal shutdown threshold. The storage device receives a thermal throttling instruction from the host and switches to a second mode to communicate with the host using a second protocol that uses less resources than the first protocol. The storage device performs thermal throttling until the temperature of the storage device reaches a normal temperature zone. When the temperature of the storage device returns to the normal temperature zone, the storage device returns to the first mode.

20 Claims, 5 Drawing Sheets

THERMAL RECOVERY IN MULTI-PROTOCOL DEVICES

BACKGROUND

Non-volatile storage devices, such as solid-state drives (SSD) and the like, may include one or more memory devices for storing data and a controller for managing the internal operations of the storage device. A storage device may be a multi-protocol storage device wherein the controller may include multiple interfaces to support multiple protocols used in communications with a host. For example, the storage device may support lower resource intensive protocols such as a Secure Digital (SD) protocol, a Universal Flash Storage (UFS) protocol, or a Universal Serial Bus (USB) protocol (i.e., protocols with minimal hardware and Application Specific Integrated Circuit (ASIC) components in the data-path pipeline). The storage device may also support higher resource intensive protocols such as a Peripheral Component Interconnect Express-Nonvolatile Memory Express (PCIe-NVMe) protocol (i.e., a protocol with bit complex logic including more hardware and ASIC logics in its hardware implementation).

When multiple integrated circuits (ICs) are present on the printed circuit board (PCB) on the storage device, the temperature of the storage device may increase based on thermal levels of multiple ICs. The power consumption on the storage device executing the PCIe-NVMe protocol may also increase because of the relatively higher performance requirement of the PCIe-NVMe interface. The thermal state of the storage device may also be dependent on the ambient temperature of the storage device and user requirements. To protect the thermal state of the storage device, firmware in the storage device may periodically measure the temperature using thermal detectors placed at multiple places including, for example, inside the ASIC, the memory device, on the PCB, etc.

A storage device operating with a thermal state in a normal operation zone may provide the highest performance as guaranteed by the storage device specification. High temperatures outside the normal operation zone may damage components on the storage device and/or degrade the performance of the storage device. As such, the controller may implement one or more algorithms to maintain the thermal state of the storage device such that the temperature of the storage device may remain below a predefined normal operating temperature threshold. When the temperature of the storage device exceeds the normal operating temperature threshold, the controller may execute one or more thermal throttling algorithms to bring the temperature below the normal operating temperature threshold.

In some cases, when the temperature rises above the predefined normal operating temperature threshold, the controller may determine that the storage device is operating in thermal operation zone 1. The thermal throttling algorithm may attempt to control/reduce performance on the storage device to bring the temperature of the storage device from thermal operation zone 1 below the normal operating temperature threshold. If the controller is unsuccessful in reducing the temperature and the temperature rises above a predefined zone 1 temperature threshold, the controller may determine that the storage device is operating in thermal operation zone 2. The thermal throttling algorithm may similarly attempt to control/reduce performance on the storage device to bring the temperature of the storage device from thermal operation zone 2 below the normal operating temperature threshold. If the controller is again unsuccessful in reducing the temperature and the temperature rises above a predefined zone 2 temperature threshold, the thermal throttling algorithm may similarly attempt to control/reduce performance on the storage device to bring the temperature of the storage device from thermal operation zone 2 below the predefined normal operating temperature. If the controller is again unsuccessful in reducing the temperature and the temperature rises above a predefined thermal shutdown threshold, the controller may determine that the storage device is in a thermal shutdown zone.

In the thermal shutdown zone, the storage device may move to a shutdown state with no active components. When the storage device is shut down, normal operation may be denied to the host. The host may reset the storage device to bring it back to the normal operation state. In multi-protocol devices, there are no mechanisms, other than full shutdown of the storage device, to reduce temperature when the storage device enters the thermal shutdown zone.

SUMMARY

In some implementations, a multi-protocol storage device may avoid entering a thermal shutdown mode by switching between protocols before the temperature on the storage device enters a thermal shutdown zone. The storage device may include a controller that communicates with the host in a first mode using a first protocol. The controller may receive a temperature request from the host and may monitor the temperature on the storage device. The controller may transmit a response to the host when the temperature on the storage device meets a predefined temperature that is below a thermal shutdown threshold and may receive a thermal throttling instruction from the host. In response to the thermal throttling instruction, the controller may switch to a second mode to communicate with the host using a second protocol that is less resource intensive than the first protocol. The controller may perform thermal throttling until the temperature of the storage device reaches a normal temperature zone. When the temperature of the storage device returns to the normal temperature zone, the controller may return to the first mode.

In some implementations, a method is provided to prevent a storage device communicatively coupled to a host from entering a thermal shutdown mode while maintaining operations on the storage device. The method may include communicating with the host in a first mode using a first protocol and receiving a temperature request from the host. The method may also include monitoring temperature on the storage device, determining when the temperature on the storage device meets a predefined temperature, and transmitting a response to the temperature request to the host when the temperature of the storage device meets the predefined temperature. The method may further include receiving a thermal throttling instruction from the host, switching to a second mode to communicate with the host using a second protocol that is less resource intensive than the first protocol, performing thermal throttling in the second mode, and returning to the first mode when the temperature of the storage device enters a normal operation zone.

Figure 1:
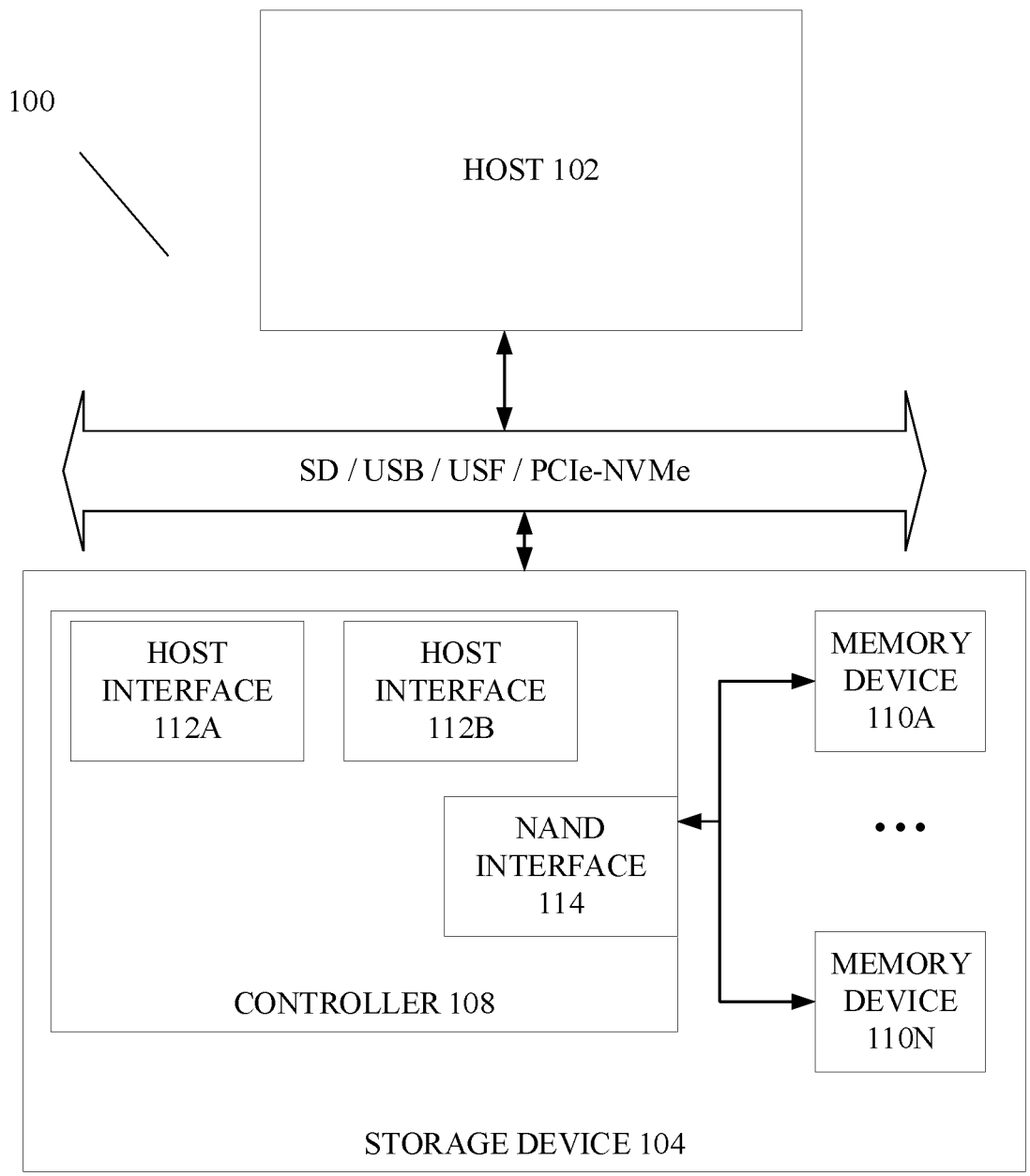
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 may transmit commands to read data from or write data to storage device 104. Host 102 and storage device 104 may be in the same physical location as components on a single computing device or on different computing devices that are communicatively coupled. Storage device 104, in various embodiments, may be disposed in one or more different locations relative to the host 102. Host 102 may include additional components (not shown in this figure for the sake of simplicity).

Storage device 104 may include a controller 108 and one or more memory devices 110a-110n (referred to herein as memory device(s) 110). Storage device 104 may be, for example, a multi-protocol solid-state drive (SSD), and the like. As a multi-protocol device, storage device 104 may support two or more protocols that may have different resource requirements. A first protocol used by storage device 104 may be a high resource intensive protocol including, for example, a PCIe-NVMe protocol. A second protocol used by storage device 104 may be a lower resource intensive protocol including, for example, a Secure Digital (SD) protocol, a USB protocol, or UFS protocol. In one example, storage device 104 may support the SD protocol and a PCIe-NVMe protocol. In another example, storage device 104 may support a USB or UFS protocol and the PCIe-NVMe protocol. As such, storage device 104 may include multiple host protocol interfaces 112a-112b to enable storage device 104 to communicate with host 102 via a specific protocol. For example, storage device 104 may use host protocol interface 112a for the first protocol and host protocol interface 112b for the second protocol.

During initialization, host 102 may use the lower resource intensive protocol to communicate with storage device 104. During normal operations, host 102 may switch to the higher resource intensive protocol for higher performance and operate in a first mode. Although FIG. 1 shows storage device 104 supporting two protocols, storage device 104 may support more than two protocols.

Storage device 104 may further include a NAND interface 114 to communicate with memory device 110. Memory device 110 may be flash based, including, for example, NAND flash memory. Memory device 110 may be included in storage device 104 or may be otherwise communicatively coupled to storage device 104. Memory device 110 may store host data, wherein based on instructions received from host 102, controller 108 may process foreground operations to read data from and/or write data to memory device 110.

Controller 108 may also execute background operations to manage resources on memory device 110. For example, controller 108 may monitor memory device 110 and may execute garbage collection and other relocation functions per internal relocation algorithms to refresh and/or relocate the data on memory device 110. Controller 108 may also monitor the temperature of components on storage device 104. For example, controller 108 may periodically obtain the temperature from one or more components on storage device 104 by polling firmware in storage device 104 that may periodically measure the temperature using thermal detectors placed at multiple places on storage device 104. Thermal detectors may be placed, for example, inside controller 108, memory device 110, on the PCB, etc.

When the temperature on storage device 104 is below a predefined normal operating temperature threshold, controller 108 may determine that storage device 104 is operating in a normal operation zone. When the temperature on storage device 104 rises above the normal operating temperature threshold, controller 108 may determine that storage device 104 is operating in thermal operation zone 1. Controller 108 may execute one or more thermal throttling algorithms to control/reduce performance on storage device 104 and bring the temperature of storage device 104 below the normal operating temperature threshold. If controller 108 is unsuccessful in reducing the temperature of storage device 104 and the temperature rises above a predefined zone 1 temperature threshold, controller 108 may determine that storage device 104 is operating in thermal operation zone 2. Controller 108 may similarly attempt to reduce the temperature of storage device 104 below the normal operating temperature threshold. If the controller is still unsuccessful in reducing the temperature and the temperature rises above a predefined zone 2 temperature threshold, controller 108 may similarly attempt to reduce the temperature of storage device 104 below the normal operating temperature threshold. If controller 108 is still unsuccessful in reducing the temperature and the temperature rises above a predefined thermal shutdown threshold, controller 108 may determine that the storage device is in a thermal shutdown zone.

To prevent storage device 104 from entering the thermal shutdown zone, host 102 may execute a protocol switch algorithm. The protocol switch algorithm on host 102 may send a temperature Asynchronous Event Request (AER) to storage device 104. In the temperature AER, host 102 may request that storage device 104 report the temperature of storage device 104 and/or a notification when the temperature exceeds the zone 2 temperature threshold but is below the thermal shutdown threshold. The protocol switch algorithm on host 102 may monitor responses received from storage device 104 for a response to the temperature AER.

Controller 108 may also execute a protocol switch algorithm to process temperature related instructions transmitted from host 102. For example, the protocol switch algorithm on storage device 104 may process the temperature AER received from host 102. When storage device 104 receives the temperature AER, if the temperature condition specified in the temperature AER has not been met, storage device 104 may keep the temperature AER pending in a command queue. When the temperature condition specified in the temperature AER occurs on storage device 104, the protocol switch algorithm on storage device 104 may alert controller 108 to reply to the temperature AER previously received from host 102. Controller 108 may send a reply to the temperature AER to the protocol switch algorithm on host 102.

When the protocol switch algorithm on host 102 receives a response to the temperature AER, host 102 may instruct controller 108 to perform thermal throttling by switching from the higher resource intensive protocol to the lower resource intensive protocol. For example, if storage device 104 is executing the SD protocol and the PCIe-NVMe protocol, host 102 may instruct controller 108 to perform thermal throttling by switching from the PCIe-NVMe protocol to the SD protocol. The protocol switch algorithm on host 102 may also cause host 102 to switch to the lower resource intensive protocol, wherein host 102 may, for example, cut down multiple PCIe lanes rather than keeping them operational for lower input/output during thermal throttling in storage device 104.

By switching from the higher resource intensive protocol with higher hardware requirements to the lower resource intensive protocol with less hardware requirements, controller 108 may also switch off one or more hardware and firmware components on storage device 104 and move to a lower-power consuming host specification. As such, after switching to the lower resource intensive protocol by host 102 and storage device 104, host 102 may still access data on memory device 110 while controller 108 attempts to bring the temperature of storage device 104 below the normal operating temperature threshold.

When controller 108 switches from the higher resource intensive protocol to the lower resource intensive protocol, controller 108 may determine that the protocol change is because of thermal recovery and may set storage device 104 from the first mode to a second mode. Controller 108 may perform mount operations due to the mode change including tagging information associated with the mode change as mount metadata and may throttle the mount process in the second mode. For example, controller 108 may initialize storage device 104 in the second mode, wherein controller 108 may take device specific actions during the reset and mount process in the second mode. For example, controller 108 may initialize (mount) storage device 104 using special configurations such as using a predefined minimum/maximum number of NAND dies and resources and increasing the mount latency owing to temperature conditions. In addition, controller 108 may abstain from parity generation of open blocks during the mount.

When storage device 104 is mounted in the second mode, controller 108 may use the mount metadata to execute decisions on storage device 104 that may impact the thermal behavior of storage device 104. For example, based on the metadata, controller 108 may modify data relocation ratios and/or bitwise logic (for example, a garbage collection balancing ratio and/or XOR generation logic) until storage device 104 returns to the normal operation zone in the second mode. When in the second mode and before storage device 104 returns to the normal operation zone, controller 108 may also disable performance related hardware and continue to throttle the host data to accelerate the thermal handling in the second mode. Thresholds set in the second mode may be different and more flexible than those set in the first mode, owing to the second mode executing the lower resource intensive protocol and using less hardware to support storage device 104.

Typically, lower resource intensive protocols may allow for sector wise throttling to perform a larger chunk of background operation. When storage device switches to the second mode, controller 108 may shut one or more of the non-participating Flash Interface Modules (FIMs) and/or NAND dies in a periodic fashion and switch on those flash channels and NAND dies when data needs to be retrieved or written to them. This may allow sufficient time for storage device 104 to cool down, enabling it to enter the normal operation zone faster. Shutting down of flash channels and/or NAND dies may be made optionally based on a threshold temperature and system design to control for the impact these actions may have on storage device 104.

By implementing the protocol switching on storage device 104 and host 102, storage device 104 may avoid going to non-operational state through thermal shutdown. Storage device 104 may also enable an accelerated thermal recovery by choosing all possible paths, both from storage device 104 as well as from host 102. When host 102 determines that the temperature on storage device 104 has decreased and that storage device 104 has returned to the normal operation zone, host 102 may switch to and instruct storage device 104 to switch from the second mode to the first mode (i.e., to switch from the lower resource intensive protocol to the higher resource intensive protocol).

Storage device 104 may perform these processes based on a processor, for example, controller 108 executing software instructions stored by a non-transitory computer-readable medium. As used herein, the term "computer-readable medium" refers to a non-transitory memory device. Software instructions may be read into the memory device from another computer-readable medium or from another device. When executed, software instructions stored in the memory device may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 1 are provided as an example. In practice, host 102 and/or storage device 104 may include additional components, fewer components, different components, or differently arranged components than those shown in FIG. 1. Additionally, or alternatively, a set of components (e.g., one or more components) of host 102 and/or storage device 104 may perform one or more functions described as being performed by another set of components of host 102 and/or storage device 104.

Figure 2:
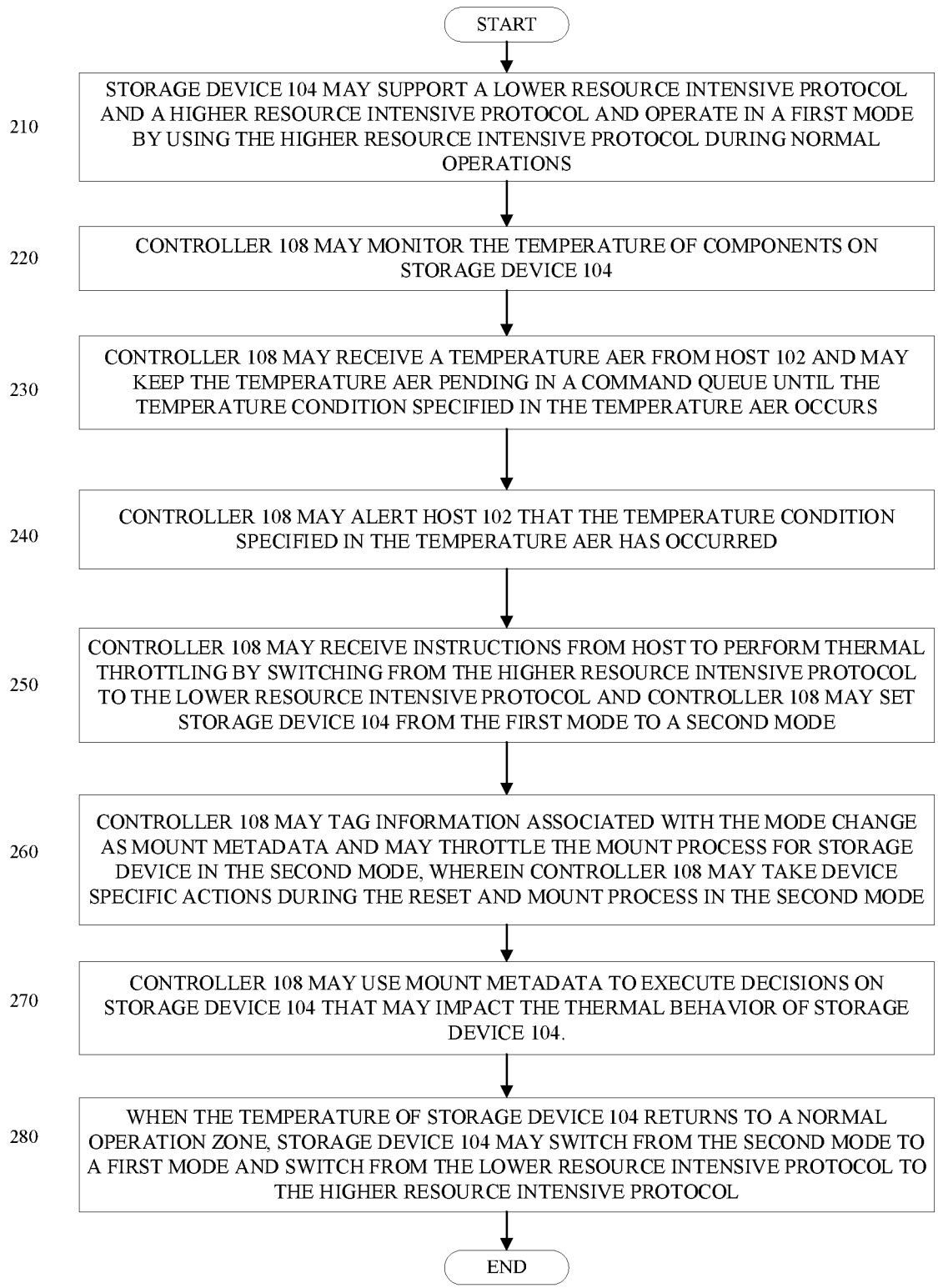
FIG. 2 is a flow diagram of an example process for performing thermal recovery in a multi-protocol storage device in accordance with some implementations.

FIG. 2 is a flow diagram of an example process for performing thermal recovery in a multi-protocol storage device in accordance with some implementations. At 210, storage device 104 may support a lower resource intensive protocol and a higher resource intensive protocol and operate in a first mode by using the higher resource intensive protocol during normal operations. At 220, controller 108 may monitor the temperature of components on storage device 104. At 230, controller 108 may receive a temperature AER from host 102 and may keep the temperature AER pending in a command queue until the temperature condition specified in the temperature AER occurs. At 240, controller 108 may alert host 102 that the temperature condition specified in the temperature AER has occurred.

At 250, controller 108 may receive instructions from host to perform thermal throttling by switching from the higher resource intensive protocol to the lower resource intensive protocol and controller 108 may set storage device 104 from the first mode to a second mode. At 260, controller 108 may tag information associated with the mode change as mount metadata and may throttle the mount process for storage device in the second mode, wherein controller 108 may take device specific actions during the reset and mount process in the second mode. At 270, controller 108 may use mount metadata to execute decisions on storage device 104 that may impact the thermal behavior of storage device 104. At 280, when the temperature of storage device 104 returns to a normal operation zone, storage device 104 may switch from the second mode to a first mode and switch from the lower resource intensive protocol to the higher resource intensive protocol. As indicated above FIG. 2 is provided as an example. Other examples may differ from what is described in FIG. 2.

Figure 3:
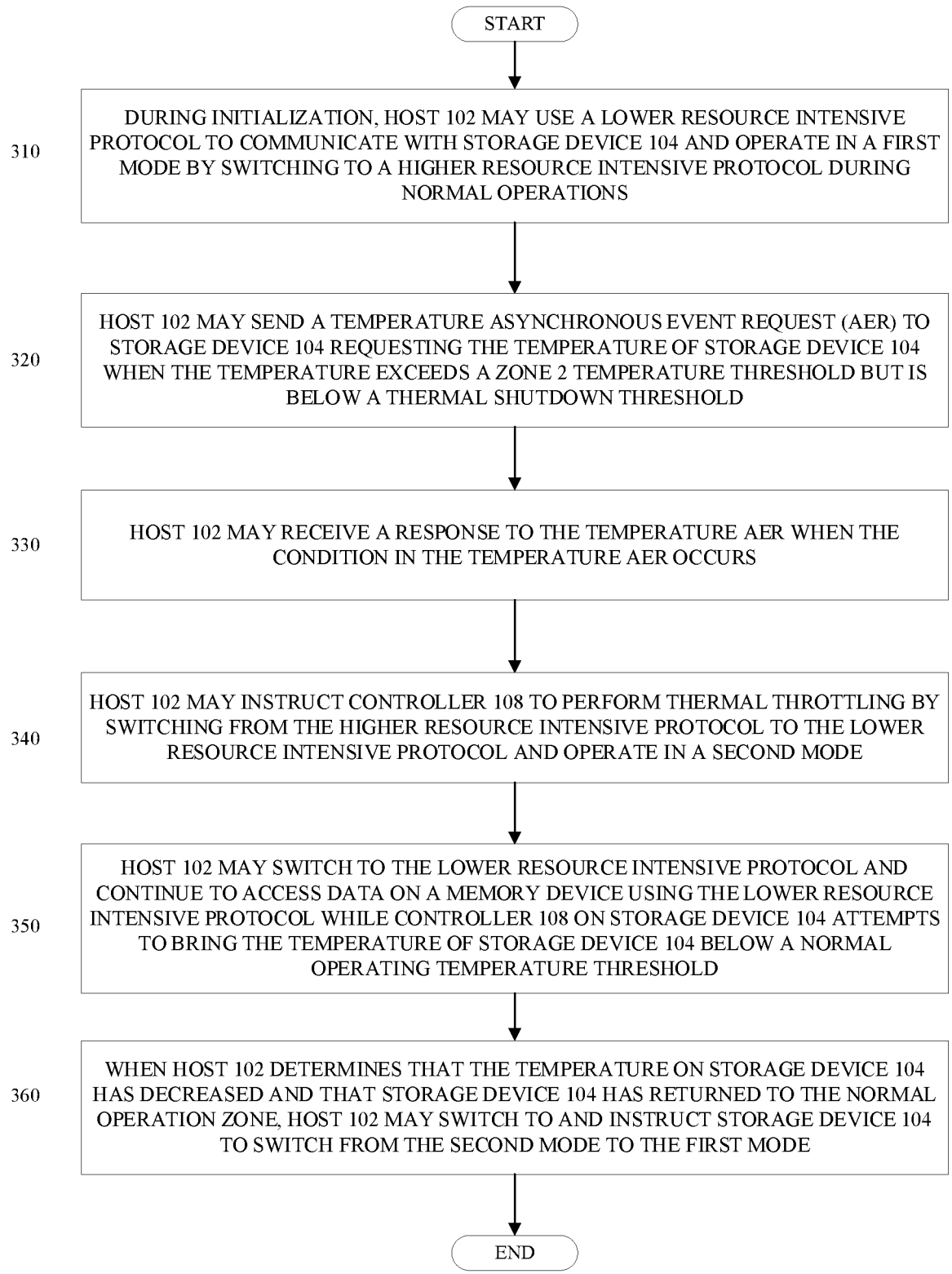
FIG. 3 is a flow diagram of an example process for performing thermal recovery on a multi-protocol storage device by a host in communication with the storage device in accordance with some implementations.

FIG. 3 is a flow diagram of an example process for performing thermal recovery on a multi-protocol storage device by a host in communication with the storage device in accordance with some implementations. At 310, during initialization, host 102 may use a lower resource intensive protocol to communicate with storage device 104 and operate in a first mode by switching to a higher resource intensive protocol during normal operations. At 320, host 102 may send a temperature Asynchronous Event Request (AER) to storage device 104 requesting the temperature of storage device 104 when the temperature exceeds a zone 2 temperature threshold but is below a thermal shutdown threshold. At 330, host 102 may receive a response to the temperature AER when the condition in the temperature AER occurs.

At 340, host 102 may instruct controller 108 to perform thermal throttling by switching from the higher resource intensive protocol to the lower resource intensive protocol and operate in a second mode. At 350, host 102 may switch to the lower resource intensive protocol and continue to access data on a memory device using the lower resource intensive protocol while controller 108 on storage device 104 attempts to bring the temperature of storage device 104 below a normal operating temperature threshold. At 360, when host 102 determines that the temperature on storage device 104 has decreased and that storage device 104 has returned to the normal operation zone, host 102 may switch to and instruct storage device 104 to switch from the second mode to the first mode. As indicated above FIG. 3 is provided as an example. Other examples may differ from what is described in FIG. 3.

Figure 4:
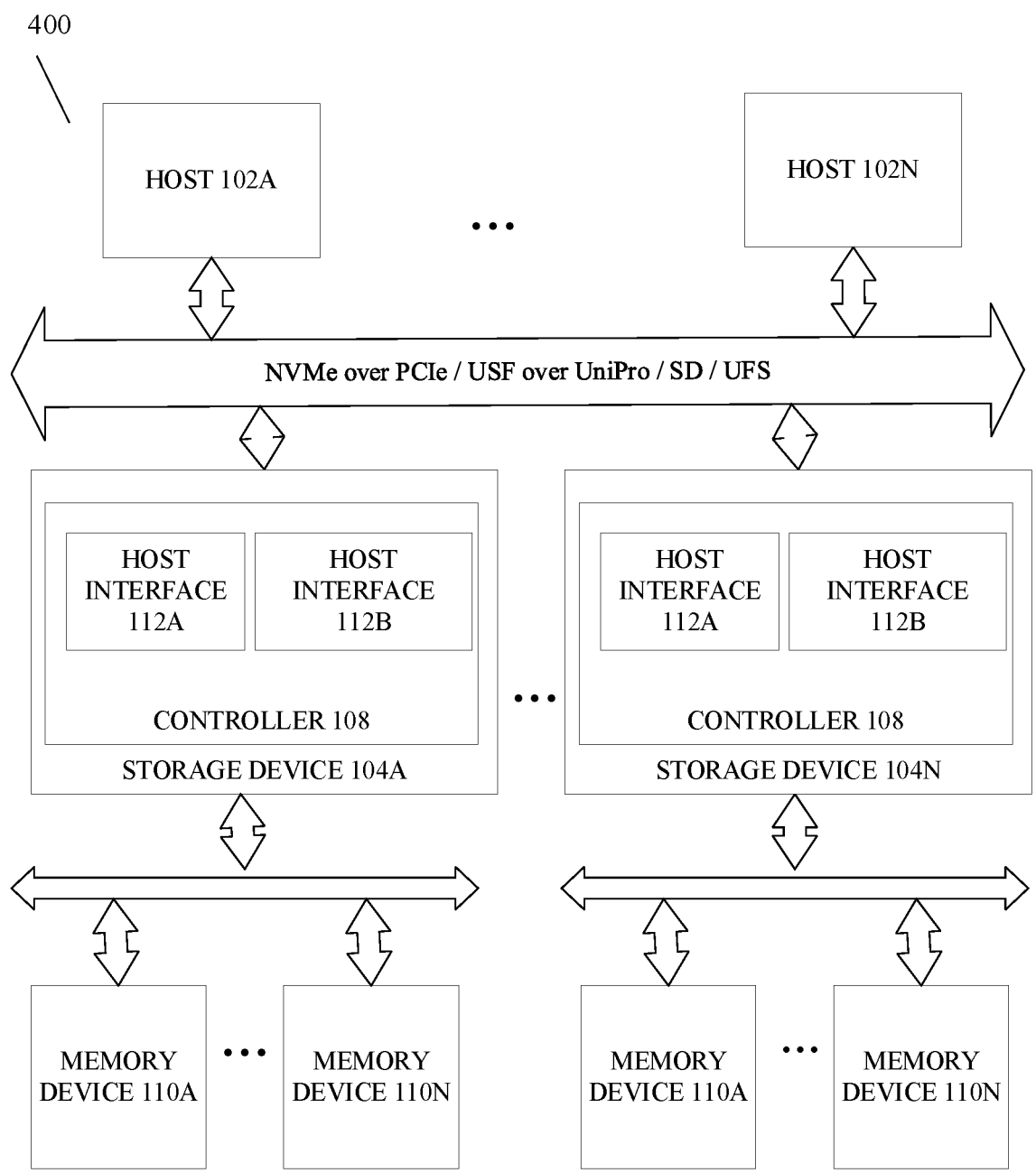
FIG. 4 is a diagram of an example environment in which systems and/or methods described herein are implemented.

FIG. 4 is a diagram of an example environment in which systems and/or methods described herein are implemented. As shown in FIG. 4, Environment 400 may include hosts 102-102n (referred to herein as host(s) 102), and storage devices 104a-104n (referred to herein as storage device(s) 104).

Storage device 104 may be a multi-protocol storage device that may include a controller 108 to manage thermal operations on storage device 104. Storage device 104 may communicate with host 102 using a higher resource intensive protocol, for example, via Non-Volatile Memory Express (NVMe) over peripheral component interconnect express (PCI Express or PCIe), or the like. Storage device 104 may also communicate with host 102 using a lower resource intensive protocol, for example, via a Secure Digital (SD) protocol, a Universal Flash Storage (UFS) protocol, or a Universal Serial Bus (USB) protocol, or the like. Controller 108 may receive instructions from host 102 to switch from the higher resource intensive protocol to the lower resource intensive protocol to prevent storage device 104 from entering a thermal shutdown mode. In switching from the higher resource intensive protocol to the lower resource intensive protocol, controller 108 may switch from a first mode to second mode, wherein controller 108 may execute decisions on storage device 104 that may impact the thermal behavior of storage device 104.

Devices of environment 400 may interconnect via wired connections, wireless connections, or a combination of wired and wireless connections. For example, the network of FIG. 4 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of Environment 400 may perform one or more functions described as being performed by another set of devices of Environment 400.

Figure 5:
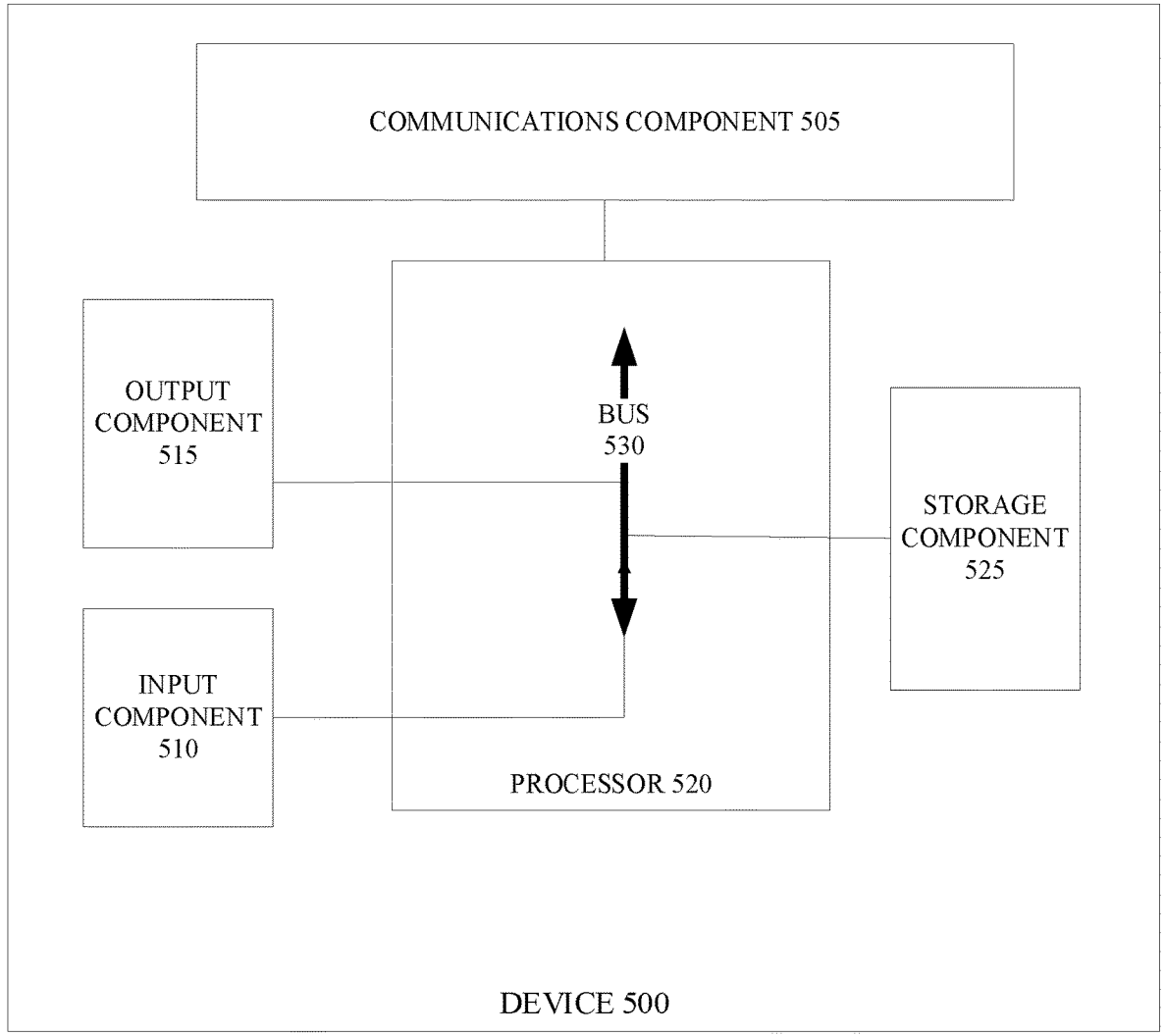
FIG. 5 is a diagram of example components of the host of FIG. 1.

FIG. 5 is a diagram of example components of one or more devices of FIG. 1. In some implementations, host 102 may include one or more devices 500 and/or one or more components of device 500. Device 500 may include, for example, a communications component 505, an input component 510, an output component 515, a processor 520, a storage component 525, and a bus 530. Bus 530 may include components that enable communication among multiple components of device 500, wherein components of device 500 may be coupled to be in communication with other components of device 500 via bus 530.

Input component 510 may include components that permit device 500 to receive information via user input (e.g., keypad, a keyboard, a mouse, a pointing device, a microphone, and/or a display screen), and/or components that permit device 500 to determine the location or other sensor information (e.g., an accelerometer, a gyroscope, an actuator, another type of positional or environmental sensor). Output component 515 may include components that provide output information from device 500 (e.g., a speaker, display screen, and/or the like). Input component 510 and output component 515 may also be coupled to be in communication with processor 520.

Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 may include one or more processors capable of being programmed to perform a function. Processor 520 may be implemented in hardware, firmware, and/or a combination of hardware and software.

Storage component 525 may include one or more memory devices, such as random-access memory (RAM), read-only memory (ROM), and/or another type of dynamic or static storage device (e.g., a flash memory, a magnetic memory, and/or optical memory) that stores information and/or instructions for use by processor 520. A memory device may include memory space within a single physical storage device or memory space spread across multiple physical storage devices. Storage component 525 may also store information and/or software related to the operation and use of device 500. For example, storage component 525 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 505 may include a transceiver-like component that enables device 500 to communicate with other devices, such as via a wired connection, a wireless connection, or a combination of wired and wireless connections. The communications component 505 may permit device 500 to receive information from another device and/or provide information to another device. For example, communications component 505 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 505 may also include one or more broadband and/or narrowband transceivers and/or other similar types of wireless transceiver configurable to communicate via a wireless network for infrastructure communications. Communications component 505 may also include one or more local area network or personal area network transceivers, such as a Wi-Fi transceiver or a Bluetooth transceiver.

Device 500 may perform one or more processes described herein. For example, device 500 may perform these processes based on processor 520 executing software instructions stored by a non-transitory computer-readable medium, such as storage component 525. As used herein, the term "computer-readable medium" refers to a non-transitory memory device. Software instructions may be read into storage component 525 from another computer-readable medium or from another device via communications component 505. When executed, software instructions stored in storage component 525 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A multi-protocol storage device communicatively coupled to a host that prevents the storage device from entering a thermal shutdown mode, the storage device comprises:
    a controller to:
        communicate with the host in a first mode using a first protocol;
        receive a temperature request from the host;
        monitor temperature on the storage device;
        transmit a response to the temperature request to the host when the temperature meets a predefined temperature that is below a thermal shutdown threshold and receive a thermal throttling instruction from the host;
        switch to a second mode to communicate with the host using a second protocol that is less resource intensive than the first protocol;
        perform thermal throttling to reduce the temperature on the storage device; and
        return to the first mode when the temperature of the storage device enters a normal operation zone.

2. The storage device of claim 1, wherein the temperature request is a temperature Asynchronous Event Request (AER) requesting a notification when the temperature of the storage device exceeds a predefined temperature that is below the thermal shutdown threshold.

3. The storage device of claim 1, wherein in the second mode the controller switches off one or more hardware and firmware components on the storage device and moves to a lower-power consuming host specification.

4. The storage device of claim 1, wherein the controller determines that the switch from the first mode to the second mode is due to thermal recovery and performs mount operations based on a mode change.

5. The storage device of claim 4, wherein the mount operations include tagging information associated with the mode change as mount metadata and throttling a mount process of the storage device.

6. The storage device of claim 4, wherein the mount operations include initializing the storage device in the second mode and taking device specific actions during a reset and mount process in the second mode.

7. The storage device of claim 6, wherein the controller initializes the storage device using special configurations including a predefined number of hardware resources and an increased mount latency.

8. The storage device of claim 6, wherein the controller abstains from parity generation of open blocks during the mount.

9. The storage device of claim 4, wherein in the second mode the controller modifies at least one of a data relocation ratio and a bitwise logic until the storage device returns to a normal operation zone.

10. The storage device of claim 4, wherein in the second mode before the storage device returns to a normal operation zone, the controller disables performance related hardware and continue to throttle host data to accelerate thermal handling in the second mode.

11. The storage device of claim 1, wherein in the second mode, the controller shuts down one or more non-participating hardware on the storage device in a periodic fashion and switches on the non-participating hardware when data needs to be retrieved or written to them.

12. A method for preventing a storage device communicatively coupled to a host from entering a thermal shutdown mode while maintaining operations on the storage device, the method comprising:
    communicating with the host in a first mode using a first protocol;
    receiving a temperature request from the host;
    monitoring temperature on the storage device;
    determining when the temperature on the storage device meets a predefined temperature;
    transmitting a response to the temperature request to the host when the temperature of the storage device meets the predefined temperature and receiving a thermal throttling instruction from the host;
    switching to a second mode to communicate with the host using a second protocol that is less resource intensive than the first protocol;
    performing thermal throttling in the second mode; and
    returning to the first mode when the temperature of the storage device enters a normal operation zone.

13. The method of claim 12, wherein receiving the temperature request comprise receiving a temperature Asynchronous Event Request (AER) requesting a notification when the temperature of the storage device exceeds a predefined temperature that is below a minimum temperature in a thermal shutdown zone.

14. The method of claim 12, wherein switching to the second mode comprises switching off one or more hardware and firmware components on the storage device and moving to a lower-power consuming host specification.

15. The method of claim 12, switching to the second mode comprises determining that the switch from the first mode to the second mode is due to thermal recovery and performing mount operations based on a mode change.

16. The method of claim 15, wherein performing mount operations comprises tagging information associated with a mode change as mount metadata and throttling a mount process of the storage device.

17. The method of claim 15, wherein performing mount operations comprises initializing the storage device in the second mode and taking device specific actions during a reset and mount process in the second mode.

18. The method of claim 15, wherein performing mount operations comprises at least one of initializing the storage device using special configurations including a predefined number of hardware resources and an increased mount latency and abstaining from parity generation of open blocks during the mount.

19. The method of claim 15, wherein performing mount operations comprises:
    modifying at least one of a data relocation ratio and a bitwise logic until the storage device returns to a normal operation zone, and
    before the storage device returns to a normal operation zone, disabling performance related hardware and continuing to throttle host data to accelerate thermal handling in the second mode.

20. The method of claim 12, wherein switching to the second mode comprises shutting down one or more non-participating hardware on the storage device in a periodic fashion and switching on the non-participating hardware when data needs to be retrieved or written to them.

* * * * *